United States Patent [19]

Gottschalk et al.

[11] 4,005,066
[45] Jan. 25, 1977

[54] ISOTRIDECYLAMMONIUM SALTS OF CHROMIUM OR COBALT 1:2 COMPLEX AZO DYES

[75] Inventors: Peter Gottschalk; Alfred Schoellig, both of Limburgerhof; Guenther Riedel, Heidelberg-Wieblingen, all of Germany

[73] Assignee: BASF Aktiengesellschaft, Ludwigshafen (Rhine), Germany

[22] Filed: June 26, 1974

[21] Appl. No.: 483,241

[30] Foreign Application Priority Data

July 5, 1973 Germany .......................... 2334228

[52] U.S. Cl. ...................... 260/145 A; 260/145 R; 260/145 B; 260/145 C; 260/146 R; 260/146 D; 260/146 T; 260/147; 260/148; 260/149; 260/150; 260/151; 260/208
[51] Int. Cl.² ......................................... C09B 43/00
[58] Field of Search .......... 260/145 A, 145 B, 147, 260/151, 208, 145 R, 145 C, 146 R, 146 D, 146 T, 148, 149, 150

[56] References Cited

UNITED STATES PATENTS

| | | | |
|---|---|---|---|
| 1,796,058 | 3/1931 | Straub et al. | 260/151 |
| 2,038,298 | 4/1936 | Kiernan | 260/208 X |
| 2,095,077 | 10/1937 | Payne | 260/208 X |
| 2,215,105 | 9/1940 | Krzikalla | 260/151 |
| 2,555,603 | 6/1951 | Ogilvie | 260/208 X |
| 2,565,898 | 8/1951 | Widmer et al. | 260/147 |
| 2,628,960 | 2/1953 | Freyermuth | 260/151 |
| 2,773,056 | 12/1956 | Helfaer | 260/208 |
| 2,814,614 | 11/1957 | Zickendraht | 260/145 B |
| 2,826,573 | 3/1958 | Strobel et al. | 260/147 |
| 2,937,165 | 5/1960 | Fiess | 260/145 B |
| 2,970,137 | 1/1961 | Whitlock | 260/145 A |
| 3,406,162 | 10/1968 | Neier | 260/151 X |

FOREIGN PATENTS OR APPLICATIONS

| | | | |
|---|---|---|---|
| 743,848 | 11/1943 | Germany | 260/147 |
| 944,409 | 12/1963 | United Kingdom | 260/147 |

*Primary Examiner*—Charles F. Warren
*Attorney, Agent, or Firm*—Johnston, Keil, Thompson & Shurtleff

[57] ABSTRACT

Isotridecylammonium salts of chromium or cobalt 1:2 complex azo dyes, their production and their use as colorants for printing inks and surface coatings. The salts are distinguished by particularly good solubility in organic solvents.

6 Claims, No Drawings

ISOTRIDECYLAMMONIUM SALTS OF CHROMIUM OR COBALT 1:2 COMPLEX AZO DYES

The invention relates to isotridecylammonium salts of chromium or cobalt 1:2 complex azo dyes, to their production and to their use as colorants for printing inks and surface coatings.

It is known from German Pat. No. 743,848 that complex metal compounds of azo dyes which are devoid of sulfo groups can be reacted with aliphatic amines of at least twelve carbon atoms to form valuable azo dyes which have better solubility in organic solvents than the alkali metal salts of the corresponding metal 1:2 complex dyes. As disclosed in German Pat. No. 1,260,652 the solubility of ammonium salts of 1:2 metal complex dyes can be further increased by using a primary, secondary or tertiary amine containing at least one oxygen atom in ether combination as the amine component. The better solubility in ketones and glycols is emphasized in the said reference. Finally, German Pat. No. 1,266,727 discloses 1:2 metal complexes of azo dyes which contain sulfo groups and which are reacted with the above-mentioned amines containing oxygen in ether combination to form ammonium salts whose solubility in organic solvents is similarly improved but still does not fully satisfy the ever rising standards.

We have now found that isotridecylammonium salts of chromium or cobalt 1:2 complex azo dyes show particularly good solubilities in organic solvents generally. Especially in the industrially important solvents, i.e. esters and ketones, such complex salts are of outstandingly good solubility with or without a content of sulfo groups. Examples of such esters and ketones are: ethyl acetate, propyl acetate, n-butyl acetate, isobutyl acetate, acetone and methyl ethyl ketone.

The metal complexes forming the basis of the isotridecylammonium salts of chromium and cobalt 1:2 complex azo dyes are the same as in the said Specifications.

The 1:2 chromium and cobalt complexes of o,o'-disubstituted azo dyes and azomethine dyes and particularly of o,o'-dihydroxyazo dyes, o,o'-dihydroxyazomethine dyes, o-carboxy-o'-hydroxyazo dyes and o-carboxy-o'-hydroxyazomethine dyes are preferred. The 1:2 metal complex dyes may contain sulfo groups or may be devoid of sulfo groups. Lakes of 1:2 metal complexes with basic dyes are also of importance. The relevant literature (for example Venkataraman, "Chemistry of Synthetic Dyes" (1952) and Fortschritte der chemischen Forschung, volume 7, part 4 (1967)) may be referred to for details.

Isotridecylamines for reaction with the 1:2 metal complex dyes to form the corresponding ammonium salts according to the invention may be prepared by any convenient conventional method. Isotridecylamines which have been prepared by reaction of ammonia with an isotridecyl alcohol mixture such as is obtained from the industrial oxo synthesis of $C_{12}$ olefins (tetrapropylene) followed by hydrogenation of the aldehydes obtained (cf. "Produkte aus der Oxo-Synthese", published by Farbwerke Hoechst AG, 1969, particularly pages 87 and 116, Table 10) give salts having particularly favorable solubility properties. This isotridecyl alcohol mixture is a mixture of primary $C_{13}$ alcohols having branched carbon chains. The boiling point range is given as 250° to 265° C, the density $d_4^{20°}$ as about 0.845, the refractive index $n_D^{20}$ as 1.448, the setting point as −66° C and the viscosity at 20° C as 40.5 centipoises.

The isotridecylammonium salts of chromium or cobalt 1:2 complex azo dyes according to the invention may be prepared by a conventional method from the isotridecylamine and the 1:2 metal complex dye, for example analogously to the description in German Pat. No. 1,260,652 (cf. particularly the general statements in column 1, line 36 to column 2, line 23). It is preferred to react the isotridecylamine in the form of its formate or acetate with an alkali metal salt of the metal complex dye direct in an ester or ketone which is liquid at room temperature or a mixture of both as solvent so that without intermediate isolation of the dye salt there is obtained a particularly easily handled, concentrated, ready-for-use solution. Having regard to further processing these solutions may conveniently have a concentration of from 20 to 60% and preferably from 30 to 50% by weight of isotridecylammonium salt of the metal complex azo dye based on the solution.

The improvement in solubility in esters and ketones, which may be a multiple of that of the dyes containing ether groups, is of particular importance because esters and ketones are widely used as solvents for printing inks, inks for ball point pens, transparent coating compositions, coatings for film, sheeting and foil, wood stains and the like which contain film-forming resins which are soluble in esters and ketones as the binder. Thus for example polymers which are soluble in esters and which are based on vinyl chloride and vinyl acetate are used. These polymers exhibit a favorable evolution of solvent, i.e. a rapid and satisfactory drying is ensured. Ethyl acetate and methyl ethyl ketone are particularly preferred as solvents.

The following Examples illustrate the invention. The parts and percentages specified are by weight.

EXAMPLE 1

214 parts of the sodium salt of the chromium 1:2 complex from diazotized anthranilic acid and 1-phenyl-3-methylpyrazolone is dissolved in 600 parts of dimethylformamide. The solution has added to it while stirring 60 parts of formic acid and 130 parts of a mixture of isotridecylamines such as is obtained in the reaction of a mixture of isotridecyl alcohols from the oxo synthesis with ammonia. After two hours at about 50° C the formation of the ammonium salt of the metal complex is completed. The azo dye is precipitated by allowing the mixture to flow into water, isolated and dried at about 60° C. The product thus obtained is superior as regards solubility in methyl ethyl ketone and ethyl acetate to the analogous dye which can be prepared with 1-(β-ethylhexoxy)-3-aminopropane according to Example 2 of German Pat. No. 1,260,652 and which is available commercially as Neozapon Yellow R (Color Index, volume 5, Solvent Yellow 82), as may be seen from the following comparison: MEK = methyl ethyl ketone, EA = ethyl acetate.

| | Solubility in g/l in | |
|---|---|---|
| | MEK | EA |
| Dye according to Example 2 of German Patent 1,260,652 | 40 | 25 |
| Dye according to the invention | 200 | 150 |

EXAMPLE 2

The cobalt 1:2 complex dye from a mixture of 4-nitro-2-aminophenol, diazotized and coupled with 1-phenyl-3-methyl-5-pyrazolone and 5-nitro-2-aminophenol diazotized and coupled with β-naphthol which is described in German Pat. No. 1,260,652 and available commercially under the name Zapon Fast Brown BE (C.I. 3, volume 5, Solvent Brown 37) is soluble in ethyl acetate to the extent of 10 g/l.

242 parts of this dye is reacted in 400 parts of dimethylformamide with 60 parts of an isotridecylamine mixture according to Example 1 at 50° C to form the ammonium salt. The reaction is over after from 1 hour to 2 hours. The dye salt solution formed is allowed to flow into water at about 10° C. The precipitated dye salt is isolated by filtration and dried. The solubility of the dye salt obtained in ethyl acetate is more than 200 g/l.

Comparative Example with 1-(β-ethylhexoxy)3-aminopropane as the agent for forming the ammonium salt according to German Pat. No. 1,260,652.

242 parts of the complex dye C.I. Solvent Brown 37 is reacted in 400 parts of dimethylformamide in the presence of 60 parts of formic acid with 90 parts of 1-(β-ethylhexoxy)-3-aminopropane at 50° C to form the ammonium salt. The solubility in ethyl acetate is determined as 100 g/l.

EXAMPLE 3

130 parts of the disodium salt of the chromium 1:2 complex dye from 4-nitro-2-aminophenol-6-sulfonic acid, diazotized and coupled with 1-phenyl-3-methyl-5-pyrazolone, is suspended in 1500 parts of water. This suspension is added while stirring at 10° C to a solution of 100 parts of isotridecylamine according to Example 1 in 45 parts of formic acid (85%). The corresponding isotridecylammonium salt is formed in the course of from 1 hour to 2 hours. This is filtered off and dried. 160 parts of dye salt is obtained having a solubility in ethyl acetate of more than 300 g/l. The analogous salt prepared with 1-(β-ethylhexoxy)-3-aminopropane according to German Pat. No. 1,266,727 has a solubility in ethyl acetate of about 60 g/l.

EXAMPLE 4

95 parts of the equimolar mixture of the chromium 1:2 complex dyes from 4nitro-2-aminophenol, diazotized and coupled with 1-phenyl-3-methyl-5-pyrazolone and 5-nitro-2-aminophenol, diazotized and coupled with 1-phenyl-3-methyl-5-pyrazolone is stirred well in 2000 parts of water at a temperature of 95° C and the pH is adjusted to 10 to 10.5 by adding caustic soda solution. A solution of 17 parts of isotridecylamine mixture, 100 parts of water and 8 parts of formic acid is allowed to flow into the suspension and stirred for several hours.

The isotridecylammonium salt of the chromium complex formed is isolated at a weakly formic acid reaction and then dried.

The dye has outstandingly good solubility in organic solvents. Whereas the commercially available 1-(β-ethoxy)-3-aminopropane salt is soluble in ethyl acetate to the extent of 30 g/l the solubility of the new salt is 200 g/l.

EXAMPLE 5

95 parts of the chromium 1:2 complex from 5-nitro-2-aminophenol, diazotized and coupled with 1-phenyl-3-methyl-5-pyrazolone, in the form of a fine aqueous suspension is adjusted to pH 10 and stirred well. A solution of 23 parts of isotridecylamine, 150 parts of water and 12 parts of formic acid is allowed to flow in within one hour. After reaction is completed the acidity of the dye suspension is corrected by adding dilute hydrochloric acid until the pH has fallen to from 2.5 to 3. The isotridecylammonium salt of the chromium 1:2 complex thus formed is isolated and dried.

The new dye is much more readily soluble than the 1-(β-ethoxy)-3-aminopropane compound. Whereas the latter will dissolve to the extent of 15 grams per liter in ethyl alcohol, the solubility of the new compound is 200 g/l. The solubilities in ethyl acetate are 55 g/l of the comparative product and 180 g/l of the new solvent dye.

EXAMPLE 6

50 parts of the chromium complex from 4-nitro-2-aminophenol-6-sulfonic acid, diazotized and coupled with 1-phenyl-3-methyl-5-pyrazolone is stirred in 1200 parts of water at 35° C. The pH of the dye suspension is adjusted to 9.5 by adding caustic soda solution. After stirring for a short time ice is added to lower the temperature to 15° C. Then while stirring intensely a solution of 23 parts of isotridecylamine, 150 parts of water and 12 parts of formic acid is added. When the ammonium salt formation is over the pH is adjusted to 3.0 by adding hydrochloric acid. The chromium complex dye obtained dissolves to the extent of more than 200 g/l in ethanol, in ethyl glycol and also in methyl ethyl ketone.

EXAMPLE 7

The chromium 1:2 mixed complex is prepared from 4-nitro-2-aminophenol and anthranilic acid, diazotized and coupled with 1-phenyl-3-methyl-5-pyrazolone and 50 parts of the complex compound is stirred at pH 10 for one hour. Then a solution of 23 parts of isotridecylamine, water and formic acid is slowly added and the whole is stirred until reaction of the complex to the isotridecylammonium salt has been completed; this takes about twenty hours. The solvent dye, after the pH has been corrected to 3.0, is recovered by filtration, dried and powdered. The solubility of the new dye is better than that of the 1-(ethoxy)-3-aminopropane dye particularly in ethyl acetate. It is more than 200 g/l whereas in the case of the comparative product it is 40 g/l.

EXAMPLE 8

95 parts of the chromium 1:2 complex from 5-nitro-2-aminophenol, diazotized and coupled with β-naphthol, and 4-nitro-2-aminophenol, diazotized and coupled with β-naphthol, is stirred well at pH 8.5 and then reacted at 35° C with 25 parts of isotridecylamine, 150 parts of water and 12 parts of formic acid. The reaction is over after from 2 to 4 hours. After cooling to ambient temperature the isotridecylamine dye is isolated and dried. The solubility is considerably improved as compared with 1-(β-ethoxy)-3-aminopropane derivative. In ethyl glycol it is increased from 70 g/l to over 200 g/l, in ethyl acetate from 10 g/l to 30 g/l and in methyl ethyl ketone from 100 g/l to 200 g/l.

We claim:

1. An isotridecylammonium salt of a chromium or cobalt 1:2 complex azo dye.

2. A mixture of isotridecylammonium salts of a chromium or cobalt 1:2 complex azo dye said salt mixture being obtained by reaction of a chromium or cobalt 1:2 complex azo dye with a mixture of isotridecylamines which in turn have been prepared by the reaction of ammonia with a mixture of primary $C_{13}$ alcohols having a boiling point range of 250° to 265° C., a density of $d_4^{20°}$ of about 0.845, a refractive index $n_D^{20}$ of 1.448, a setting point of −66° C. and a viscosity at 20° C. of 40.5 centipoises.

3. The salt claimed in claim 1 of a chromium 1:2 complex dye.

4. The salt claimed in claim 1 of a cobalt 1:2 complex dye.

5. The salt claimed in claim 2 of a chromium 1:2 complex dye.

6. The salt claimed in claim 2 of a cobalt 1:2 complex dye.

* * * * *